United States Patent
Wake et al.

(10) Patent No.: US 6,928,920 B2
(45) Date of Patent: Aug. 16, 2005

(54) WALL ARRANGEMENT FOR A SERVOMOTOR

(75) Inventors: Masato Wake, South Bend, IN (US); Wayne Hewitt, La Porte, IN (US)

(73) Assignee: Robert Bosch Corporation, Broadview, IL (US)

( * ) Notice: Subject to any disclaimer, the term of this patent is extended or adjusted under 35 U.S.C. 154(b) by 85 days.

(21) Appl. No.: 10/707,093

(22) Filed: Nov. 20, 2003

(65) Prior Publication Data

US 2005/0109203 A1    May 26, 2005

(51) Int. Cl.[7] .......................... F01B 19/02; B23P 19/02
(52) U.S. Cl. .................... 92/99; 92/49; 29/235; 29/450
(58) Field of Search ............................... 92/48, 49, 99; 29/229, 235, 450

(56) References Cited

U.S. PATENT DOCUMENTS

| | | |
|---|---|---|
| 3,083,698 A | 4/1963 | Price et al. |
| 3,517,588 A | 6/1970 | Kytta |
| 3,754,450 A | 8/1973 | Putt et al. |
| 3,897,718 A | 8/1975 | Gardner et al. |
| 3,958,497 A | 5/1976 | Gardner et al. |
| 4,453,450 A | 6/1984 | Horsting |
| 4,587,884 A | 5/1986 | Tsubouchi |
| 4,596,178 A | 6/1986 | Sugiura |
| 4,813,337 A | 3/1989 | Endo |
| 4,976,188 A | 12/1990 | Suzuki et al. |
| 4,987,824 A * | 1/1991 | Shinohara et al. ............. 92/48 |
| 5,507,216 A | 4/1996 | Suwa |
| 5,680,807 A * | 10/1997 | Wagner et al. ................. 92/48 |
| 6,345,565 B1 | 2/2002 | Tsubouchi |

* cited by examiner

Primary Examiner—Edward K. Look
Assistant Examiner—Michael Leslie
(74) Attorney, Agent, or Firm—Leo H McCormick, Jr.; Warren Comstock

(57) ABSTRACT

A movable wall for separating an interior of a housing for a brake booster into a first chamber and a second chamber. The movable wall is characterized by a diaphragm, a backing plate and a hub member. The diaphragm has a peripheral bead secured to the housing and an axial bead located in a groove in a cylindrical body of the hub member. The groove has a front face that is separated from a rear face by an arcuate transition surface located between a bottom of the groove and the front face. The axial bead has a profile corresponding to the groove and an arcuate lip that extends from a rear surface. The lip is connected by a convolute to a radial section of the disc portion of the diaphragm while the backing plate has an axial opening surrounded by a radial surface that engages the front face of the groove. The axial bead engages the radial surface to urge the radial annular surface into engagement with the front face of the groove while sealing the front chamber from the rear chamber. In response to a manual input force moving the cylindrical body, the convolute allows the cylindrical body to move without creating a radial force in the diaphragm that may cause separation between axial bead and groove.

14 Claims, 5 Drawing Sheets

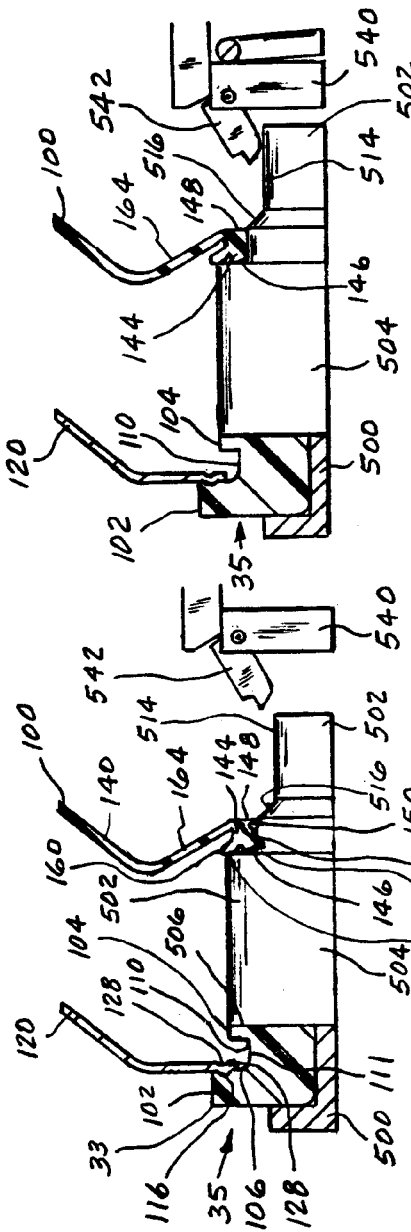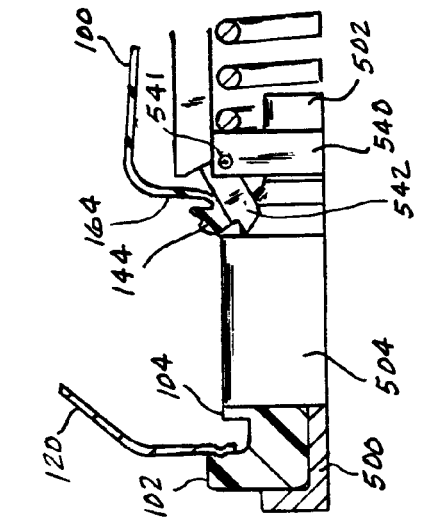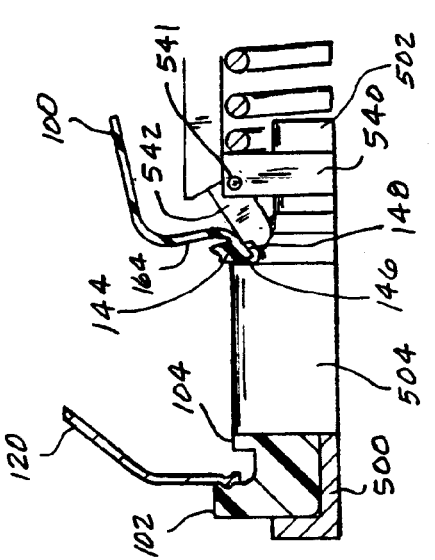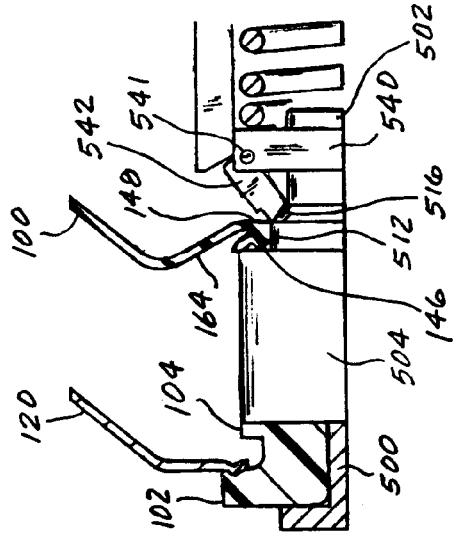

WALL ARRANGEMENT FOR A SERVOMOTOR

BACKGROUND OF INVENTION

This invention relates to a movable wall for a brake booster wherein a diaphragm that divides a cavity of housing into a first chamber and a second chamber has an axial bead that axially urges a backing plate against a shoulder of a flange on hub member while a ledge on a front face of the axial bead is constrained between the backing plate and a groove in the hub member and a convolute that extends from a rear face thereof allows the diaphragm to move with the hub during a manual brake application without the introduction of a radial force on the axial bead that may effect a seal there between.

The movable wall of a vacuum brake booster usually consist of a backing plate and a diaphragm with the diaphragm having an external peripheral bead held between flanges on a front shell and a rear shell and an internal bead retained in a groove in a hub of the movable wall to separate a front chamber from a rear chamber, such as disclosed in U.S. Pat. No. 3,083,698. In an effort to eliminated the nut type connection is was disclosed in U.S. Pat. No. 3,754,450 that an internal bead having a smaller diameter than a diameter of the groove in the hub would allow the internal bead to resiliently snap into the groove to define a radial seal between the internal bead and the bottom of the groove. Further efforts to reduce the bulk or axial dimension of the movable wall, the radial flange of the hub was reduced and a resultant output force axially transmitted into the flange through the backing plate with the internal bead holding the backing plate against the hub in a manner as disclosed in U.S. Pat. Nos. 3,897,718 and 3,958,497. During a brake application, a first pressure is present the front chamber and a second pressure is present in the rear chamber and as a result a pressure differential is created across the movable wall that creates a force that is communicated through the backing plate into the hub for providing an actuation force to develop a braking force in a master cylinder to effect a brake application. This type structural arrangement functions in an adequate manner as long as a pressure differential is created across the movable wall. Unfortunately in an absence of an available first pressure (vacuum) for the front chamber, in order to effect a brake application, a manual input force must move the hub to provide the master cylinder with an actuation force to effect a brake application. In moving the hub by the manual input force, the diaphragm is stretched and places a radial force on the internal bead such that under certain condition it may actually separate from the groove and as a result it has been suggested that a keeper be attached to the hub to retain the bead in the groove. Unfortunately, some of the input force applied to effect the manual brake application is reduced by an amount equal to the force required to stretch the diaphragm.

SUMMARY OF INVENTION

It is an object of this invention to provide a vacuum brake booster with a movable wall having a diaphragm that separates a front chamber from a rear chamber with a convolute section that substantially allows an entire manual input force to be applied to an output push rod to effect a manual brake application without a reduction by expanding as the wall moves from a rest position to an actuation position.

In more particular detail, the brake booster according to the present invention has a first shell that is joined to a second shell to create a housing. The interior of the housing is divided by a movable wall into a first chamber and a second chamber with the first chamber permanently connected to receive fluid having a first pressure (vacuum) while the second chamber is selectively connected to receive fluid having the first pressure (vacuum) during a period of rest and a second pressure (atmospheric pressure) during a period of actuation. Actuation occurs as a function of an input force applied to a valve to create a pressure differential across the movable wall. The pressure differential acts on the movable wall to develop an output force that is applied to a master cylinder to effect a brake application. In the absence of the availability of vacuum, an input force applied to the valve is essentially entirely transmitted from an input member through the hub to manually effect a brake application. The movable wall according to the invention is characterized by a diaphragm, a backing plate and the hub. The diaphragm is defined by a disc having a peripheral bead that is retained between the first and second shells and an axial bead that is located in a groove of a cylindrical body of the hub. The cylindrical body of the hub has a flange that extends a first distance from the cylindrical body and a rib that extends a second distance from the cylindrical body such that the flange forms a front face and the rib forms a rear face for the groove. The cylindrical body has an arcuate transition surface that is located between a bottom of the groove and the front face. The axial bead has a profile corresponding to the resulting groove and an arcuate lip that extends from a rear surface with a convolute that extends from the arcuate lip to a radial section of the disc the disc. The backing plate has a disc with a profile that essentially corresponds to the shape of the diaphragm and a radial annular surface that engages the front face of the groove while the axial bead engages and urges the radial annular surface into engagement with the front face of the groove to separate the front chamber from the rear chamber. In response to an input force being applied to the valve in an absence of the availability of vacuum, input force is applied to the output push rod through the hub and the convolute allows the hub to move without creating a radial force in the diaphragm that may cause the axial bead to move out of contact with the bottom of the groove.

An advantage of this invention resides in the compaction of the axial bead of a diaphragm in a groove on a cylindrical body of a hub to seal a front chamber from a rear chamber.

It is an object of this invention to provide a brake booster with a backing plate and diaphragm wherein the backing plate assists in retaining an axial bead in a groove to maintain a sealed relationship between the axial bead and a groove in a hub of a movable wall.

BRIEF DESCRIPTION OF DRAWINGS

FIGS. 4–14 are schematic views of the steps for in attaching the backing plate and diaphragm to a hub of the movable wall of the brake booster of FIG. 1.

DETAILED DESCRIPTION

Figure 1:
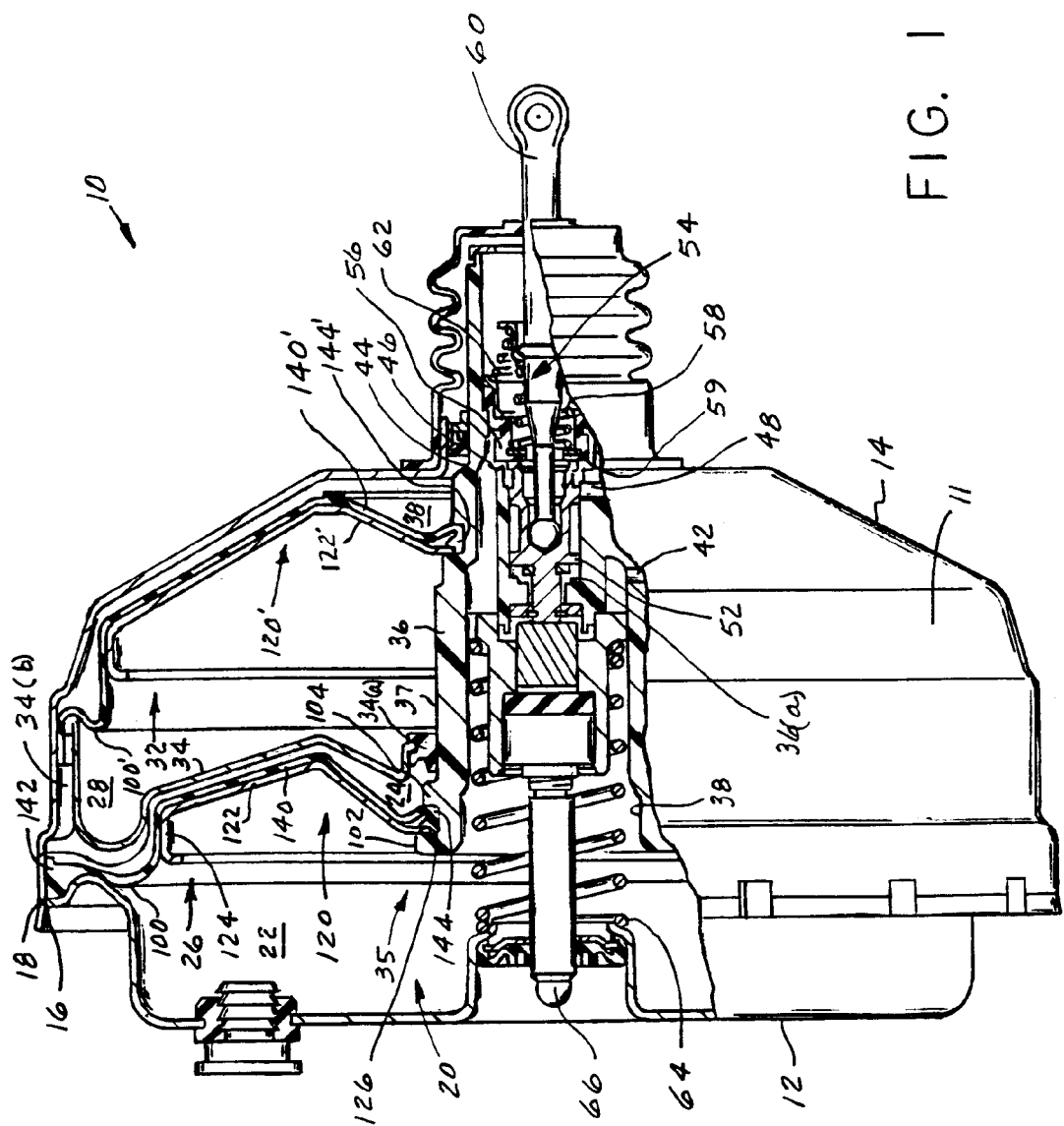
FIG. 1 is a sectional view of a brake booster having a movable walls made according to the present invention.

A tandem brake booster 10 illustrated in FIG. 1 is made according to the present invention and is defined by a housing 11. Housing 11 is constructed a front shell 12 that is joined to a rear shell 14 by rolling a lip 16 on the rear shell 14 over an annular flange 18 on the front shell 12 to create a unitary structure of a type illustrated in U.S. Pat. No. 6,390,567. In joining the front shell 12 to the rear shell 14, an interior cavity 20 is created that is separated into a first chamber 22 and a second chamber 24 by a first wall assembly 26 and into a third chamber 28 and a fourth chamber 30 by a second wall assembly 32. The second chamber 24 is separated from the third chamber 28 by a partition member 34 that engages the rear shell 14 and a cylindrical body 36 of hub 35 that extends through the first 26 and second 32 wall assemblies. The cylindrical body 36 has a stepped internal bore 38 that receives a control valve 40 that is connected to a brake pedal. The cylindrical body 36 has a radial opening 42 therein through which bore 38 connects the first chamber 22 to the third chamber 28, a passage 44 through which the first chamber 22 is connected to an annular vacuum seat 46 in bore 38, a passage 48 through which the bore 38 adjacent the vacuum seat 44 is connected to the fourth chamber 30. The control valve 40 that is located in bore 38 includes a plunger 52 and a poppet member 54. The poppet member 54 has a first end that is fixed to the cylindrical body 36 and a flexible annular face 56 that is urged toward valve seat 46 by a first spring 58 retained on a push rod 60 connected to the brake pedal. in addition, a second spring 62 acts on the push rod 60 to urge the plunger 52 toward an atmospheric seat 59 on face 56 of the poppet member 54.

Figure 2:
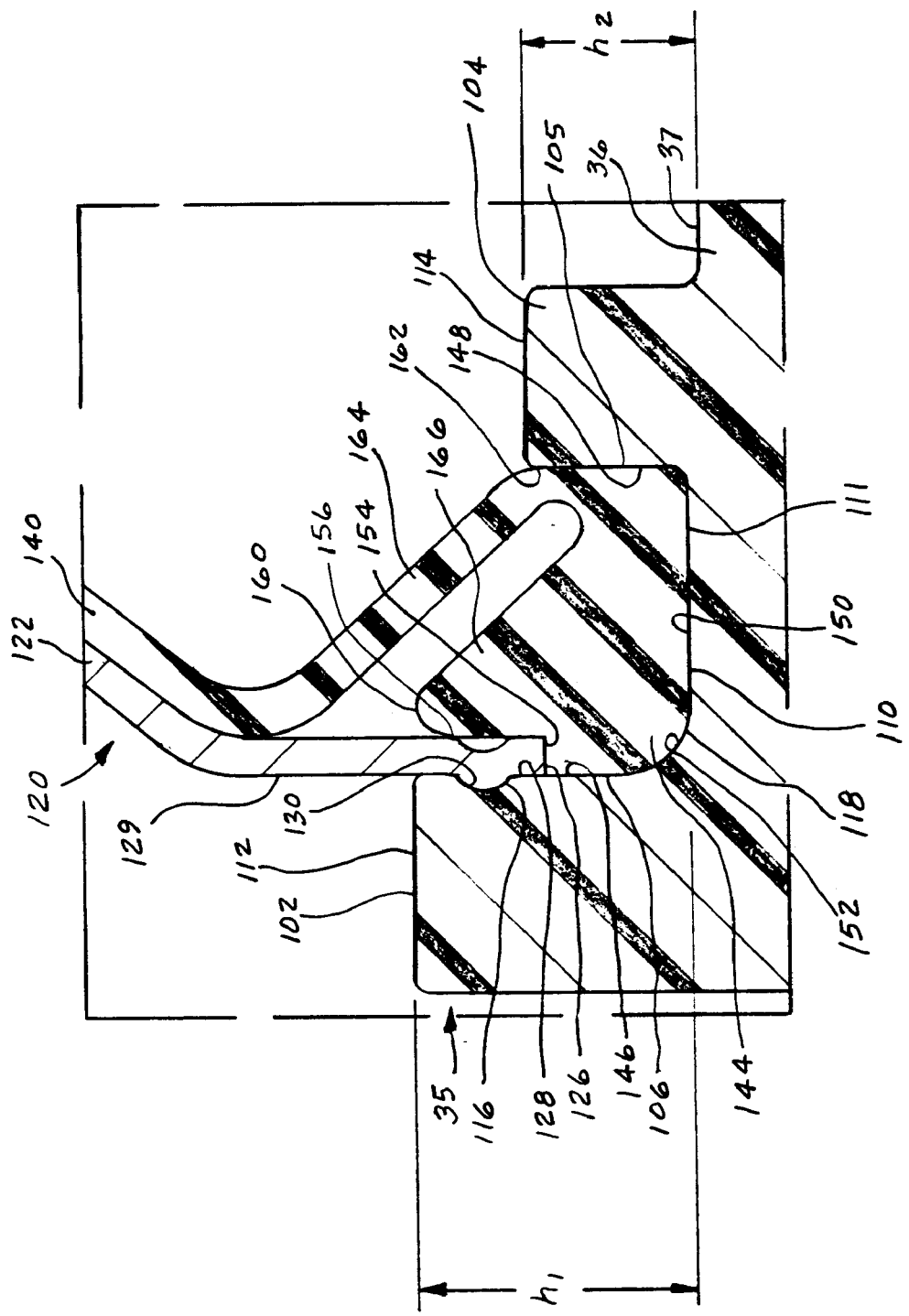
FIG. 2 is an enlarged sectional view of an axial bead for a diaphragm of a movable wall of FIG. 1.

In response to an input force applied by an operator to brake pedal, push rod 60 moves such that spring 58 urges face 56 into engagement with vacuum seat 46 to interrupt communication through passage 44 and thereafter moves plunger away from seat 58 to allow air from the surrounding environment to be communicated from bore 38 to passage 48 for distribution to chambers 30 and to chamber 24 by way of flow path 64 formed adjacent the peripheral of the interior cavity 20. The air that is communicated to chambers 30 and 24 creates a pressure differential with vacuum available in chambers 22 and 28 such that an operational force is created across the first 26 and second 32 wall assemblies. This operational force is carried through the first 26 and second 32 wall assemblies into hub 36 and after overcoming return spring 64 provides push rod 66 with an actuation force to pressurize fluid in a master cylinder (not shown) and effect a power assist brake application. In an absence of the availability of vacuum in chambers 22 and 28, an input force applied to the brake pedal after overcoming the force of return spring 64 is directly communicated through cylindrical body 36 to push rod 66 to pressurize fluid in master cylinder to effect a manual brake application as illustrated in FIG. 2 without a reduction caused by a force required to expand the diaphragms 100,100' in walls assemblies 26 and 32.

The relationship of the wall assemblies 26 and 32 with respect to the cylindrical body 36 of hub 35 are essentially identical and as a result in the specification and drawings a same number with a ' may be used to identify a similar feature, as wall assembly 26 consists of a backing plate 120 and diaphragm 100 and wall assembly 32 consists of backing plate 120' and diaphragm 100'.

Figure 3:
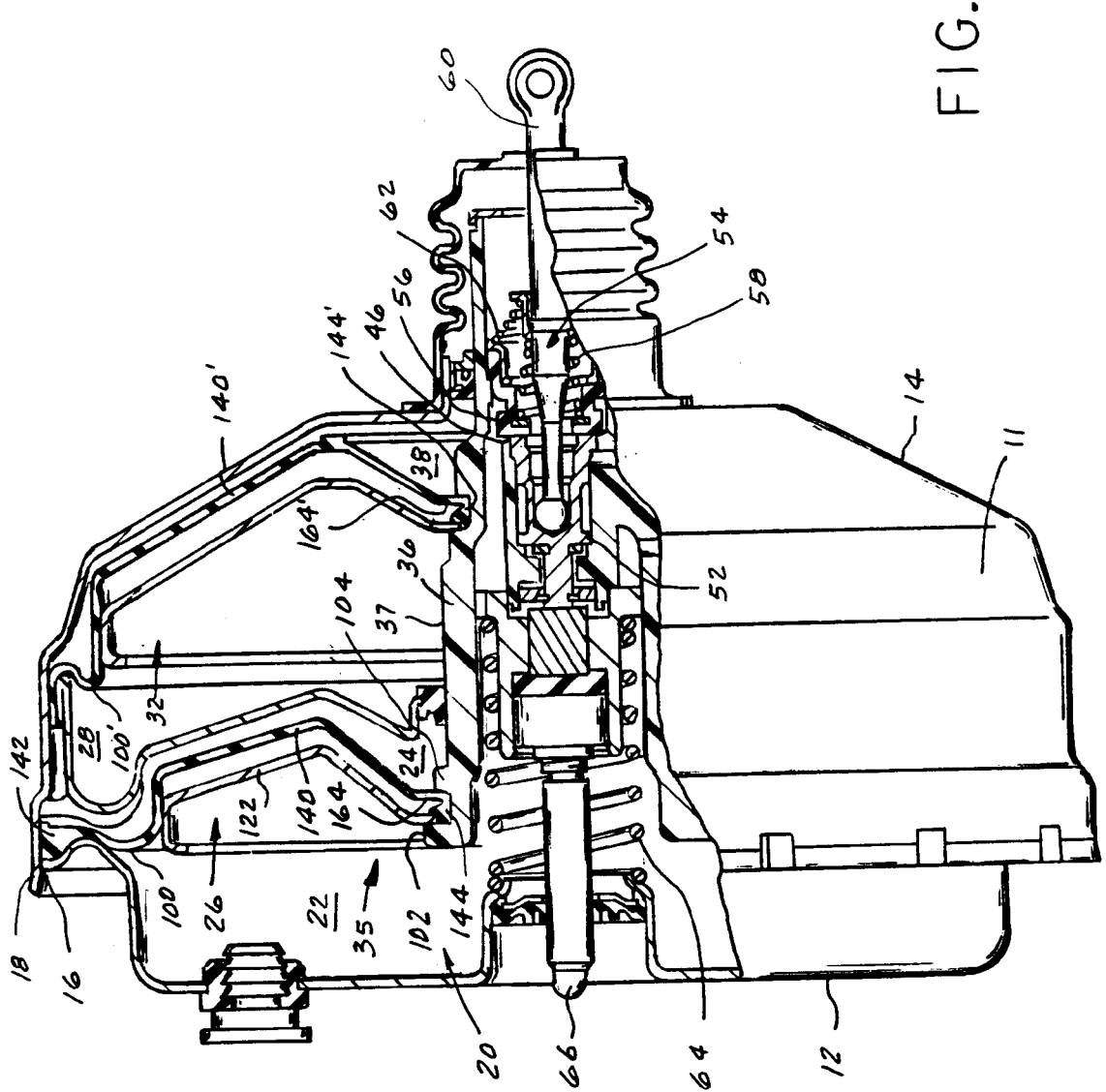
FIG. 3 is a sectional view of the brake booster of FIG. 1 during a manual brake application.
Figure 10:
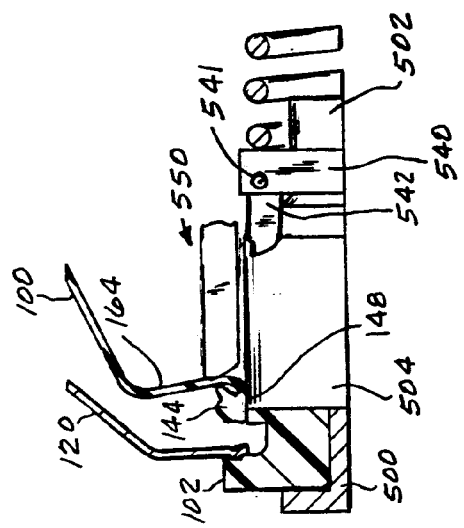
Figure 11:
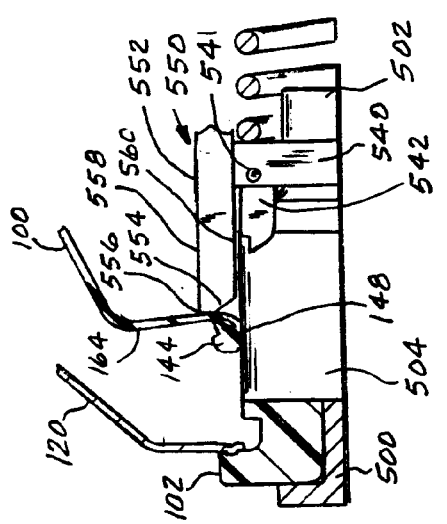
Figure 12:
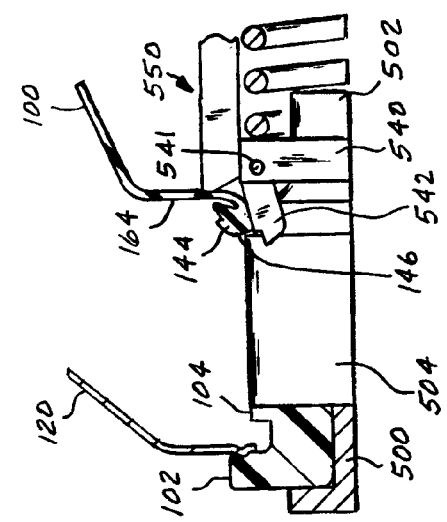
Figure 13:
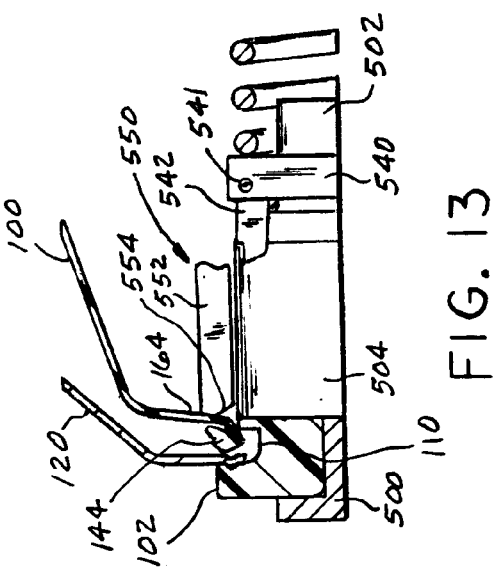
Figure 14:
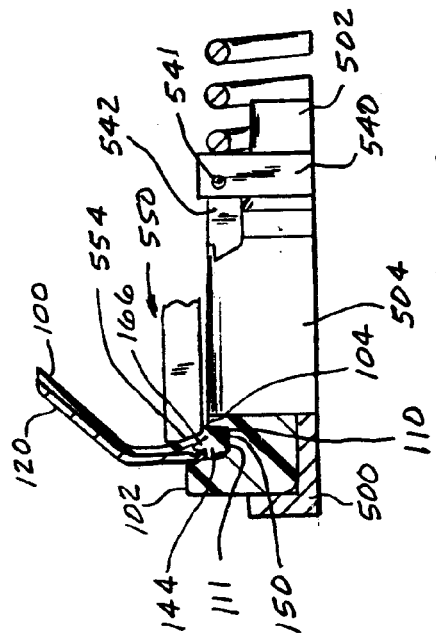

The cylindrical body 36, as best illustrated in FIG. 3, is defined by a peripheral surface with a flange 102 that is separated from an annular rib 104 wherein the flange 102 forms a front face 106 and the annular rib 104 forms a rear face 105 for a groove 110. The flange 102 having a peripheral surface 112 at a first height "$h^1$" and annular rib 104 has a second peripheral surface 114 at a second height "$h^2$" from a peripheral surface 37 of the cylindrical body 36. The flange 102 has an arcuate indentation 116 adjacent the peripheral surface 112 that transitions into the radial surface of the front face 106 while an arcuate surface 118 transitions the bottom 111 of groove 110 into the front face 106.

A backing plate 120 is defined by a disc 122 that has a peripheral surface 124 that approximates the diameter of housing 11 and an axial opening 126 that is perpendicular to a radial surface 128. In addition, disc 122 may also include an annular projection 130 through which a portion 129 of disc 122 may be offset from the radial surface 128 to better nestle within cavity 20. The backing plate 120 is placed on cylindrical body 36 such that the annular projection 130 is mated with the arcuate indentation 116 on flange 102 to assist in axially centering radial surface 128 on the front face 106 in groove 110.

A diaphragm 100 is defined by a disc 140 with a peripheral bead 142 and an axial bead 144. The peripheral bead 142 is fixed between a shoulder on the front shell 12 and a shoulder on the partition 34 while the axial bead 144 is located in groove 110. The axial bead 144 has a profile substantially identical with groove 110 with a front face 146 separated from a rear face 148 by an cylindrical axial bead 150 that transitions through an arcuate surface 152 into the front face 146 and wherein the front face 146 is parallel to the rear face 148. A ledge 154 extends from the front face 146 to a shoulder 156 that is located in a plane that is substantially parallel with the rear face 148 and the shoulder 156 extends from the ledge 154 to an apex 160 such that the height of the apex 160 from the axial cylindrical surface 150 is approximately equal to the height $h^1$ of flange 106. The axial bead 144 is further characterized by a lip 162 that extends from the rear face 148 that is connected by a convolute 164 to disc 140 and a ramp 166 that extends from adjacent lip 162 to the apex 160. The axial bead 144 is located in groove 110 such that front face 146, arcuate surface 152, cylindrical surface 150 and rear face 148 are axially compacted between the front face 106, arcuate surface 118 and rear face 105 on the cylindrical body 36 while the shoulder 156 acts on radial surface 128 to hold backing plate 120 against flange 106.

Mode of Constructing a Wall Assembly

FIGS. 4–14 illustrate steps that are required to attach the wall assemblies 26 and 32 to hub 35.

This process may include the following steps: a hub 35, as best shown in FIG. 2, is obtained from a source that is defined by a cylindrical body 36 with a flange 102 on a first end 33 that is separated from an annular rib 104. The flange 102 forms a front face 106 and the annular rib 104 forms a rear face 105 of a groove 110 on the peripheral surface 37 of the cylindrical body 36. The flange 102 has a height $h^1$ to define a first peripheral surface 112 above the cylindrical body 36 while the rib 104 has a height $h^2$ to define a second peripheral surface 114 above the peripheral surface 37. The peripheral surface 37 of the cylindrical body 36 has an arcuate surface 118 that transitions a bottom 111 of groove 110 into the front face 106. The flange 102 has an arcuate indentation 116 adjacent the peripheral surface 37 that transitions into the radial surface of the front face 106; the hub 35 is placed on a first fixture 500 and a second fixture 502 is placed on the peripheral surface 37 of the cylindrical body 36, as shown in FIG. 4. The second fixture 502 is defined by a first sleeve 504 with a first end 506 that engages rib 114 and a second end 508. The first sleeve 504 has a first diameter 505 that corresponds to the height $h^2$ of rib 114, the first diameter 505 extends from the first end 506 to a radial shoulder 510 from a smaller second diameter 512 and a still smaller third diameter 514 that extends from the second end 508 to a ramp 516 that connects the third diameter 514 with the second diameter 512. In addition sleeve 504 has a arcuate surface 518 that transitions the second diameter 512 into the radial shoulder 510; a backing plate 120, of the type illustrated in FIGS. 1 and 2, is obtained from a source, the backing plate 120 is defined by a disc 122 having an axial opening 126 that is surrounded by a radial surface 128 and an annular projection 130 through which a portion 129 of the disc 122 may be offset from the radial surface 128; the backing plate 120 is placed on the cylindrical body 36, see FIG. 4, such that the annular projection 130 is mated with the annular indentation 116 on flange 106 and the radial surface 128 engages the front face 106 to center the axial opening 126 within groove 110 of the cylindrical body 36; thereafter, a diaphragm 100 of a type illustrated in FIGS. 1 and 2 is obtained from a source that is defined by a disc 140 with an peripheral bead 142 and an axial bead 144. The axial bead 144 including a convolute 164 that extends from a lip 162 on a rear face 148, an inner peripheral face 150 with a cylindrical section that extends from the rear face 148 through an arcuate section 152 to a front face 146 that is parallel to the rear face 148. The front face 146 is further characterized by a ledge 154 that extends to a shoulder 156 that is radially aligned in a plane parallel with the front face 146 and extends to an apex 160 such that the height of the apex 160 from face 150 is approximately equal to the height $h^1$ of flange 102. The axial bead is further characterized by a ramp 166 that extends from adjacent lip 162 to the apex 160; the diaphragm 100 is now placed on the second fixture 502 as shown in FIG. 5 with the axial bead 144 being located on the second diameter 512 of sleeve 504 with the front face 146 engaging shoulder 510; a third fixture 540 is brought into alignment with the second fixture 502, the third fixture 540 including a plurality of legs 542 (only one of which is shown) that engage the third diameter 514 of sleeve 504, the legs 542 are initially positioned in a plane that is at an angle with respect to the axis of the second fixture 502, see FIG. 6; the third fixture 540 is axially moved toward the first fixture 500 such that the legs 542 progressively pivot about pin 541 while engaging the third diameter 514, ramp 516, second diameter 512 of sleeve 504 and rear face 148 of axial bead 144, see FIG. 7, and cause the axial bead 144 to rotate see FIG. 8, and move the rear face 148 onto the plurality of legs 542, see FIG. 9, when the plurality of legs 542 have pivoted to an axial position with respect to the axis of the second fixture 502; a fourth fixture 550 is moved toward the third fixture 540, see FIG. 10. The fourth fixture 550 is defined by a second sleeve 552 with a face 554 on a first end that is characterized by an annular apex 556 that extends from an outer peripheral surface 558 toward and inner peripheral surface 560; the second sleeve 552 is moved into engagement with the axial bead 144, see FIG. 11, to slide the rear face 148 off the plurality of legs 542 and onto the first diameter 505 of the first sleeve 504 of the second fixture 502 and slide the axial bead 144 toward the first fixture 500, see FIG. 12 such when the rear face 148 passes over the peripheral surface 114 of rib 104, the axial bead 144 tilts toward groove 110 on the cylindrical member 36, see FIG. 13; the second sleeve 552 of the fourth fixture 550 continues to move toward the first fixture 500 and the third face 554 engages the convolute 164, see FIG. 14 and thereafter acts on the ramp 166 to compact the axial bead 144 into groove 110 such that the inner peripheral face 150 of the axial bead 144 engages the bottom 111 of groove 110, front face 146 engages face 106, rear face 148 engages face 105 and to form a sealed surface while shoulder surface 156 engages radial surface 128 to hold the backing plate 120 against flange 102 to complete the installation of wall assembly 26 with respect to hub 35.

the fourth fixture 550, third fixture 540 and second 502 fixtures are now removed from the cylindrical body 36; a partition member 34, of a type shown in FIG. 1 having an inner surface 34a and an outer surface 34b is obtained from a source and placed on the cylindrical body 36 with the inner surface 34a sealingly engaging the cylindrical body 36 while the outer surface 34b will later be located between the front shell 12 and rear shell 14 to separate the interior of the housing; and thereafter wall assembly 32 is attached to hub 35 in a manner hereinafter described that is similar to that described above with respect to wall assembly 26.

a second fixture 502' is again brought into engagement with the cylindrical body 36; a second backing plate 120' is placed on flange 102'; an axial bead 144' of a second diaphragm 100' is obtained from a supply and placed on the second diameter 512 of fixture 502'; a third fixture 540 is brought into engagement with the second fixture 502 and the plurality of legs 542 brought into engagement with the axial bead 144' and as the third fixture moves toward the first fixture 500 the axial bead 144' rotated to bring the rear face 148' onto the legs 542; finally face 554 of the fourth fixture 550 is brought into engagement the axial bead 144' and the fourth fixture 550 moved toward the first fixture 500 to compact the axial bead 144' in groove 110' in a same manner as set forth above with respect to axial bead 144 to complete the attachment of bead 144' and backing plate 120' of wall assembly 32 to the cylindrical body 36 of hub 35.

In radially compressing the axial bead 144 of wall assembly 25 in groove 110 and axial bead 144' of wall assembly 32 in groove 110', the front faces 146,146 thereon respectively move past the axial openings 126,126' in disc 122,122' of the backing plates 120,120' until ledge 154 is axially aligned with the axial opening 126,126' and thereafter axially expands such that shoulders 156,156' engages radial surfaces 128,128' on disc 122,122' to hold the backing plates 120,120' in contact with the flanges 102,102'. On withdrawal of the second sleeve 554 of the fourth fixture 550 away from the first fixture 500 to a position of rest, that portion of disc 122,122' surrounding the axial openings 128,128' engages ledge 154 to assist in confining the axial beads 144,144' in grooves 110,110'. Further, ramps 166,166' respectively act on the radial surfaces 128,128' to hold the disc 122,122' in engagement with flanges 102,102'. In the installed position, convolutes 164,164' are substantially parallel with the ramps 166,166' when the axial beads 144,144' are compacted into grooves 110,110' and the diaphragms 100,100' are concentric with the backing plates 120,120'.

Mode of Operation

The tandem brake booster 10 functions in a known manner such that in response to an input force applied by an operator to a brake pedal is communicated through push rod 60 to activate the control valve 40. With vacuum available in the front chambers 22 and 28, on actuation of the control valve 40, communication of vacuum between the front chambers 22 and 28 is interrupted and air is thereafter allowed to be communicated to chambers 30 and 24 to created a pressure differential across the first 26 and second 32 wall assemblies. The pressure differential acts on the diaphragms 100,100' and backing plates 120,120' to develop an operational force that is carried through the backing plates 120,120' into flanges 102,102' by way the engagement of radial surfaces 128,128' with faces 106,106' on flange 102,102'. The operational force after overcoming return spring 64 provides push rod 66 with an actuation force to pressurize fluid in a master cylinder (not shown) and effect a power assist brake application. During a power assist brake application, the relationship of the axial beads 144,144', backing plates 120,120' and cylindrical body 36 of hub 35 remain constant as they axially move together during the development of the actuation force. In an absence of the availability of vacuum in chambers 22 and 28, an input force applied to the brake pedal from push rod 60 through plunger 52 to shoulder 36a of cylindrical member 36 and after overcoming the force of return spring 64 is directly communicated to push rod 66 to pressurize fluid in master cylinder to effect a manual brake application as illustrated in FIG. 3. As the cylindrical body 36 moves toward the front shell 12, the external beads 142,142' of diaphragms 100,100' of the wall assemblies 26 and 32 may remain stationary or lag in the movement of the cylindrical body 36 but the axial beads 144,144' move with the cylindrical body 36. As the cylindrical body 36 moves the convolutes 164,164' of axial beads 144,144' expand as shown in FIG. 3 to attenuate or eliminate any radial force that may cause the axial beads 144,144' to move away from the bottom 111,111' of groves 110,110' and as a result substantially an entire input force is directed to effecting a manual brake application.

We claim:

1. In a brake booster having a first shell that is joined to a second shell to create a housing with an interior cavity that is divided by a movable wall into a first chamber and a second chamber, said first chamber being connected to receive fluid having a first pressure while said second chamber is selectively connected to receive fluid having the first pressure and a second pressure as a function of an input force applied to a valve to create a pressure differential across the movable wall and develop an output force for effecting a brake application, said movable wall being characterized by a diaphragm, a backing plate and a hub member, said diaphragm having a disc with an peripheral and an axial bead, said peripheral bead being retained between said first and second shells while said axial bead is located in a groove in a cylindrical body of said hub member, said groove having a front face separated from a rear face with an arcuate transition surface located between a bottom of said groove and said front face, said axial bead having a profile corresponding to said groove and an arcuate lip that extends from a rear surface, said lip being connected by a convolute to a radial section of said disc, said backing plate having a profile that essentially substantially corresponds to said disc of said diaphragm with a radial annular surface that engages said front face of said groove, said axial bead engaging said backing plate to urge said radial annular surface into engagement with said front face of said groove to separate said front chamber from said rear chamber, said convolute allowing said movable wall to move in response to an input force being applied to said valve without creating a radial force in said diaphragm that may cause said axial bead to move out of contact with the bottom of said groove.

2. The tandem brake booster as recited in claim 1 wherein said axial bead is further characterized by a ledge for receiving an axial face of said radial annular surface of said backing plate, said ledge having a radial face that engages said radial annular surface of said backing plate to urge said backing plate into engagement with said front face of said groove.

3. The tandem brake booster as recited in claim 2 wherein said axial bead is further characterized by a ramp that extends from said lip toward said ledge, said ramp providing a resilient force for urging said radial annular surface into engagement with said front face of said groove.

4. The tandem brake booster as recited in claim 3 wherein said flange of said hub is further characterized by an annular indentation through which a peripheral surface thereof is connected to the front face on said groove.

5. The tandem brake booster as recited in claim 4 wherein said backing plate is characterized by an annular projection that is adjacent said radial annular surface, said annular projection being received by said annular indentation to align said radial annular surface within said groove.

6. The tandem brake booster as recited in claim 5 wherein said axial surface of said radial annular surface engages said ledge to prevent radial movement of said axial bead with respect to said groove.

7. The tandem brake booster as recited in claim 6 wherein said convolute of said disc is substantially parallel with said ramp on said axial bead.

8. A process for attaching a diaphragm and backing plate to a hub to define a movable wall of a brake booster comprising the steps of:

obtaining a hub from a source, said hub being defined by a cylindrical body with a flange that is separated from an annular rib wherein said flange forms a front face and said annular rib forms a rear face of a groove, said flange having a first peripheral surface at a first height and rib having a second peripheral surface at a second height from a peripheral surface of said cylindrical body, said peripheral surface of said cylindrical body having an arcuate surface that transitions a bottom of said groove into said front face;

placing said hub on a first fixture;

obtaining a backing plate from a source, said backing plate being defined by a disc having an axial opening that is surrounded by a radial surface;

placing said backing plate on said cylindrical body with said radial surface engaging said front face to center said axial opening within said groove of said cylindrical body;

placing a second fixture on said peripheral surface of said cylindrical body, said second fixture being defined by a first sleeve with a first end that engages said rib and a second end, said first sleeve having a first diameter surface corresponding to said second height of said rib that extends from said first end to a shoulder of a smaller second diameter surface and a smaller third diameter surface that extends from said second end to a ramp that connects said third diameter surface with said second diameter surface, said sleeve having a arcuate surface that transitions from said second diameter surface into said shoulder;

obtaining a diaphragm from a source, said diaphragm being defined by a disc with an peripheral bead and an axial bead with said axial bead including a convolute that extends from a lip on a rear face, said axial bead having an inner peripheral face with a cylindrical section that extends from said rear face through an arcuate section to a front face that is parallel to said rear face;

placing said axial bead of said diaphragm on said second diameter of said sleeve with said front face engaging said shoulder;

bringing a third fixture into alignment with said second fixture, said third fixture including a plurality of legs that engage said third diameter of said sleeve;

moving said third fixture toward said first fixture such that said legs progressively pivot while engaging said third diameter, said ramp, said second diameter and ultimately cause said axial bead to rotate and move said rear face onto said plurality of legs when said plurality of legs have pivoted to an axial position with respect to the axis of said second fixture;

moving a fourth fixture toward said toward said third fixture, said fourth fixture being defined by a second sleeve with a third face on a first end, said third face having an annular apex that extends from an outer peripheral surface toward an inner peripheral surface;

moving said second sleeve into engagement with said axial bead to slide said rear face off said plurality of legs and onto said first sleeve; moving said second sleeve to slide said axial bead toward said first fixture with said rear face passing over said rib on said cylindrical member and tilting toward said groove; and continuing to move said second sleeve toward said first fixture with said third face engaging said convolute to compact said axial bead into said groove such that said inner peripheral surface of said axial bead engages said groove to form a sealed surface between said front face and rear face of said groove.

9. The process as recited in claim 8 wherein said axial bead is further characterized by a ledge formed on said front face, said fourth fixture axially moving toward said first fixture to radially compressing said axially bead such that said ledge moves past said axial opening in said disc of said backing plate while said radial surface assists in confining said axial bead with respect to said groove on return of said fourth fixture to a position of rest.

10. The process as recited in claim 9 wherein said backing plate is further characterized by an annular projection that mates with a corresponding annular indentation in said flange to assist in axially locating said backing plate in said groove.

11. The process as recited in claim 10 wherein said axial bead is further characterized by an annular ramp that extends from adjacent said rib toward a radial shoulder for said ledge, said annular ramp urging said radial surface on said disc into engagement with said flange.

12. The process as recited in claim 11 wherein said convolute is substantially parallel with said ramp when said axial bead is compacted into said groove such that said diaphragm is concentric with said backing plate.

13. The process as recited in claim 12 wherein said axial bead of said diaphragm is axially compressed between said front face and said rear face of said cylindrical body in the compaction of said axial bead in said groove and radial compressed by the confinement of ledge and inner peripheral surface to seal axial bead within said groove.

14. The process as recited in claim 13 wherein said convolute allows hub, backing plate and diaphragm to be moved without placing a radial force on said diaphragm that would effect said seal between said axial bead and said groove.

\* \* \* \* \*